United States Patent [19]
Brassette

[11] Patent Number: 4,880,346
[45] Date of Patent: Nov. 14, 1989

[54] SELF-LOADING TRUCK AND TILT BED THEREFOR

[76] Inventor: Duane J. Brassette, P.O. Box 1202, Lake Charles, La. 70602

[21] Appl. No.: 109,268

[22] Filed: Oct. 16, 1987

[51] Int. Cl.$^4$ .................................................. B60P 1/34
[52] U.S. Cl. .................................... 414/486; 212/246; 296/14; 298/38; 414/537; 414/540
[58] Field of Search ............... 414/486, 491, 494, 540, 414/543, 559, 569, 550, 537; 296/10, 14, 32, 51, 61, 62, 57 R; 298/38; 212/246-248

[56] References Cited

U.S. PATENT DOCUMENTS

| | | | |
|---|---|---|---|
| 402,189 | 4/1889 | Oviatt | 296/10 |
| 773,239 | 10/1904 | Stone | 296/10 |
| 1,871,603 | 8/1932 | Ginter | 212/262 |
| 2,015,879 | 10/1935 | Twente | 296/10 |
| 2,145,926 | 2/1939 | Gooder | 296/10 |
| 2,297,298 | 9/1942 | Freeman | 296/14 |
| 2,405,721 | 8/1946 | Taylor | 298/38 |
| 2,821,311 | 1/1958 | Screws | 414/543 |
| 3,019,918 | 2/1962 | Keener | 414/543 |
| 3,113,681 | 12/1963 | Crile | 414/543 |
| 3,244,292 | 4/1966 | Elliott | 212/188 |
| 3,987,918 | 10/1976 | Corompt | 414/486 X |
| 4,087,129 | 5/1978 | Maxey | 298/18 |
| 4,328,988 | 5/1982 | Patterson et al. | 296/10 |
| 4,373,853 | 2/1983 | Biller et al. | 212/246 X |
| 4,419,083 | 12/1983 | Pendergraft | 414/543 |
| 4,659,276 | 4/1987 | Billet | 414/543 |
| 4,700,851 | 10/1987 | Reeve et al. | 212/246 X |

FOREIGN PATENT DOCUMENTS

| | | | |
|---|---|---|---|
| 1187353 | 2/1965 | Fed. Rep. of Germany | 414/486 |
| 18521 | 2/1979 | Japan | 414/486 |
| 763244 | 9/1980 | U.S.S.R. | 414/491 |

*Primary Examiner*—David A. Bucci
*Attorney, Agent, or Firm*—Burd, Bartz & Gutenkauf

[57] ABSTRACT

A remote controlled self-loading truck having a tilt bed equipped with a bed mounted hoist and having folddown sides, and for mounting on standard truck chassis. An elevated hoist is supported on the tiltable bed adjacent to its forward end for movement with the bed. The hoist includes an elongated generally horizontal rearwardly extending rotatably supported boom. A tail roller is journaled for rotation at the rearward edge of the flat bed. Hinged side gates are provided on opposite sides of the flat bed. Remotely manually controlled hydraulic actuators are provided for raising and lowering the bed relative to the vehicle frame, for rotating the hoist boom, and for operating the hoist winch.

21 Claims, 5 Drawing Sheets

SELF-LOADING TRUCK AND TILT BED THEREFOR

BACKGROUND OF THE INVENTION

1. Field of the Invention

This invention is directed to a remote controlled self-loading truck having a tilt bed equipped with a bed mounted hoist and having fold-down sides, and to such a tilt bed for mounting on standard truck chassis, or on the trailer chassis of standard semi-tractor-truck units. The tilt bed and bed mounted hoist are especially adapted to rear end loading for transport of elongated material such as logs, structural iron, piping, and the like, which is ordinarily difficult to load. Because the hoist functions through a pivoting loader boom, other materials can be loaded over the side. Although not essential, by the addition of rear ramps, such as palletized materials, skid mounted equipment, wheeled equipment, and the like, may be more readily loaded from the rear.

2. The Prior Art

McIntyre U.S. Pat. No. 4,318,658 shows one form of tilting bed vehicle having a bed mounted winch. However, this vehicle is for rear loading only and is primarily designed so that the rear end of the bed can be fully lowered onto the ground surface without resorting either to an impractical loading angle or an excessively rearwardly extending bed, with their attendant problems. Extensive modification of the existing frame or chassis of the supporting vehicle is required so as to provide relatively pivotable front and rear frame sections.

Milner U.S. Pat. No. 2,351,829 shows a tiltable semitrailer bed with associated winch means. However, the winch mechanism remains on the fixed portion of the trailer frame.

SUMMARY OF THE INVENTION

Broadly stated, the present invention comprises a vehicle having a frame supported on front and rear axles which are supported on wheels. A tiltable flat bed is pivotally supported adjacent its rearward end. Lift means for the bed are pivotally secured at one end to the vehicle frame and at the other end adjacent to the forward end of the bed. Elevated hoist means are supported on the tiltable bed adjacent to its forward end for movement with the bed. The hoist means includes a vertical standard rotatably supported for limited rotation about a vertical axis. An elongated boom extends rearwardly from the top of the vertical standard and is connected for rotation therewith. The boom is spaced above the deck of the flat bed. Winch means are mounted on the vertical standard for rotation with the boom. Transverse tail roller means are journaled for rotation at the rearward edge of the flat bed. Longitudinally extending hinged side gates on opposite sides of the flat bed are provided with locking means for securing the side walls in upright position. The side gates may be lowered for side loading. Remotely manually controlled power means are provided for pivoting the bed relative to the vehicle frame, for raising and lowering, for rotating the hoist boom, and for operating the winch. The invention also comprises the tilt bed for use in conjunction with standard vehicles.

BRIEF DESCRIPTION OF THE DRAWINGS

The invention is illustrated in the accompanying drawings in which.

DETAILED DESCRIPTION OF THE PREFERRED EMBODIMENT

Figures 1, 2:
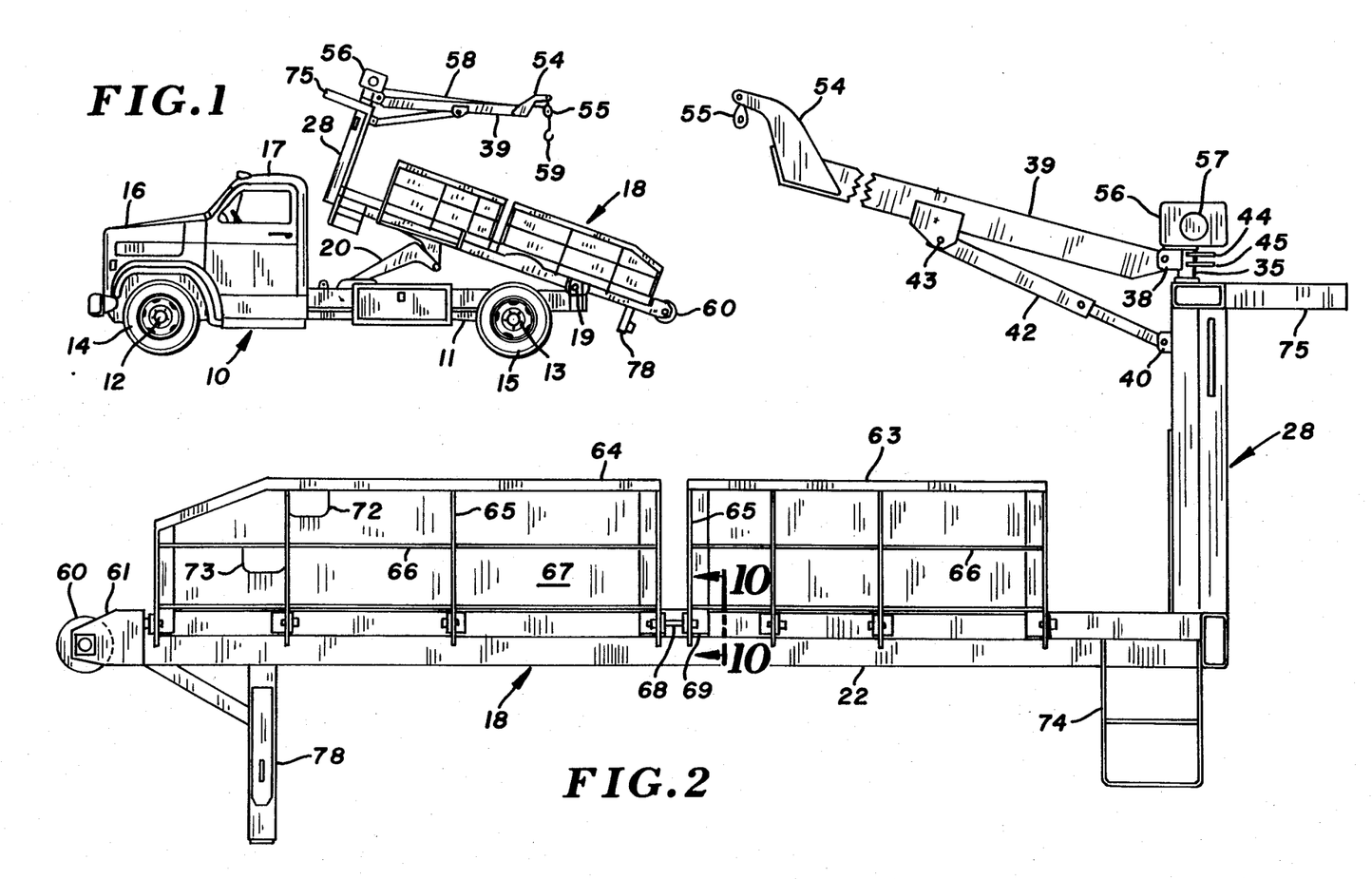
FIG. 1 is a left side elevation of a truck equipped with a tilt bed and hoist means according to the present invention.
FIG. 2 is a right side elevation of the tilt bed and hoist means.

Referring now to the drawings, and particularly to FIG. 1, there is shown one form of vehicle, truck 10, on which the tiltable bed of the present invention may be mounted. As is conventional, truck 10 includes a generally rectangular frame or chassis 11 supported on front and rear axles 12 and 13, each of which is in turn supported by front and rear wheels 14 and 15, respectively. A motor housing 16 is mounted on the forward end of the frame above the front axle and a driver's cab 17 is located rearward of the motor compartment. A tiltable flat bed, indicated generally at 18, is adapted to be supported by vehicle frame 11 and is pivotally attached to the rearward end thereof at 19. Conventional hoist or lift means 20 are pivotally attached at one end to the vehicle frame intermediate of its ends and at the other end adjacent to the forward end of the tiltable bed 18.

Figures 3, 3A:
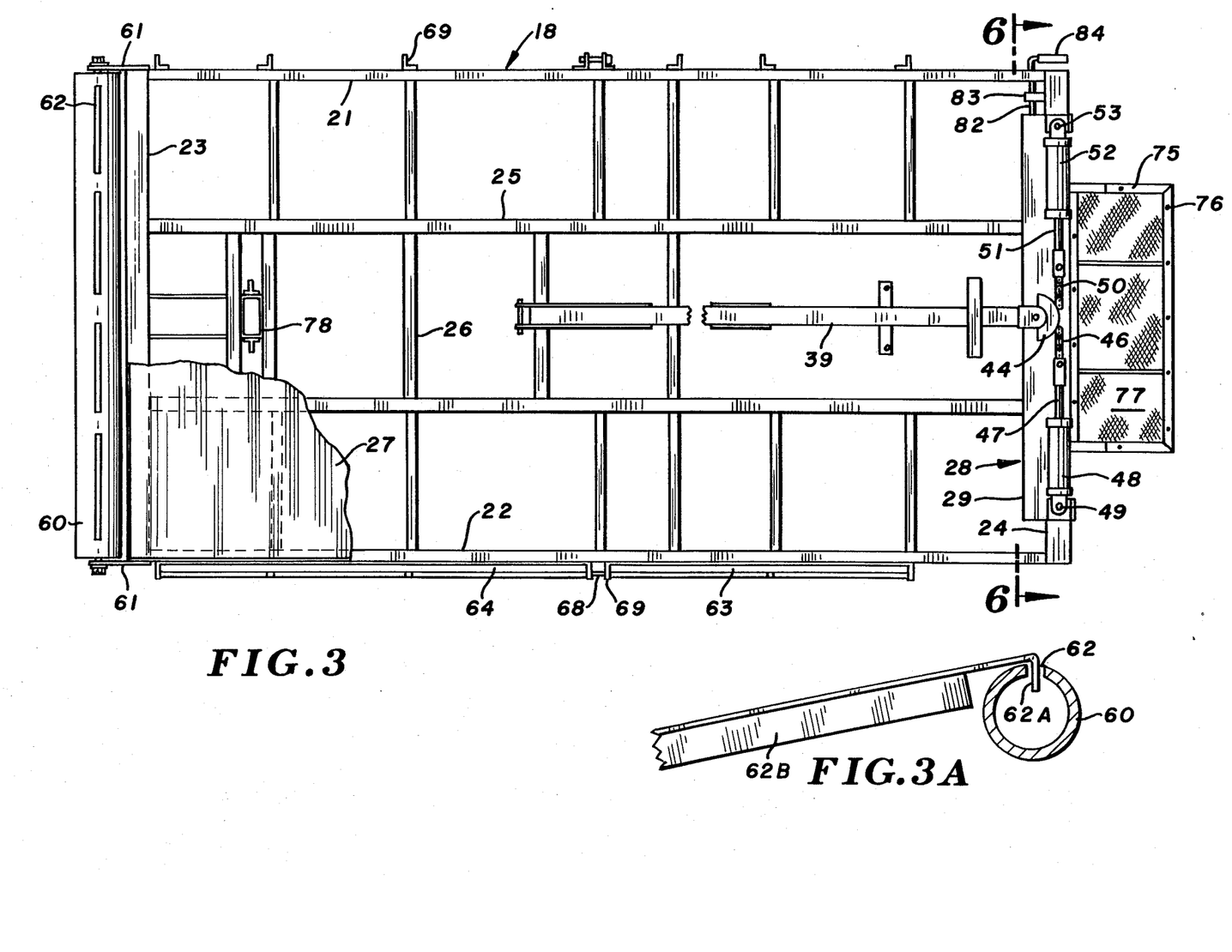
FIG. 3 is a top plan view thereof.
FIG. 3A is a fragmentary sectional view, on an enlarged scale, of the tail roller of the tilt bed showing the manner of connecting a ramp thereto.

As seen in FIGS. 2 and 3, tiltable bed 18 comprises a rectangular frame including left and right longitudinal side beams 21 and 22 and rearward and forward transverse beams 23 and 24, respectively. Intermediate longitudinal beams 25 and intermediate cross beams 26 strengthen and reinforce the bed frame. The frame is covered on its top surface with decking 27, such as steel plate.

Figure 4:
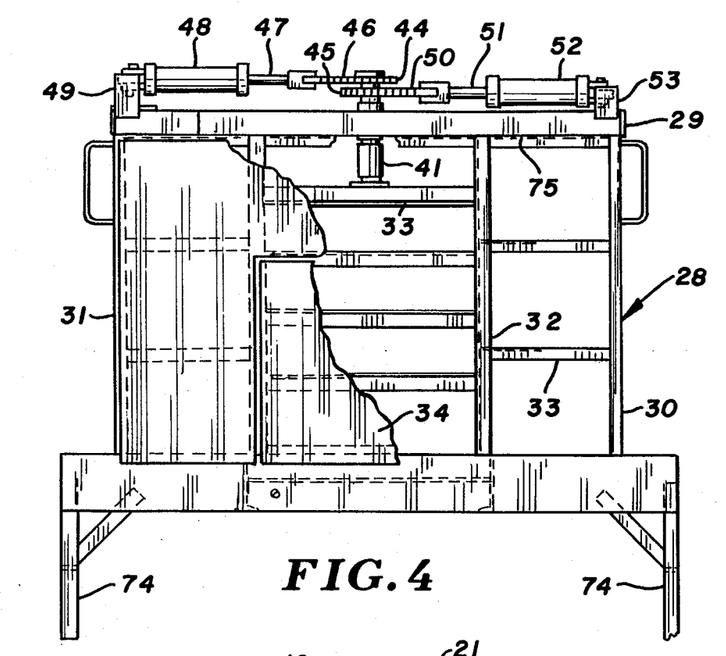
FIG. 4 is a front end elevation of the tilt and hoist means.

As seen in FIGS. 2, 3 and 4, a forward wall or bulkhead, indicated generally at 28, is supported by and extends vertically upward from forward cross beam 24 so as to be immediately rearward of the truck cab when the bed is in its lowered position. Bulkhead 28 comprises a frame including upper horizontal cross beam 29 supported by left and right vertical members 30 and 31, respectively. Intermediate vertical supports 32 and cross beams 33 reinforce and strengthen the bulkhead frame. Paneling 34, such as steel plate, preferably covers the bulkhead frame.

Figure 5:
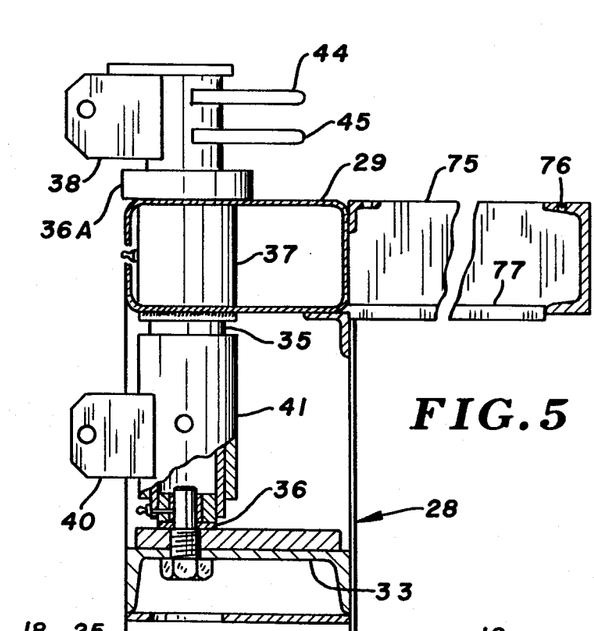
FIG. 5 is a fragmentary vertical section on an enlarged scale showing details of the hoist boom mount.

A vertical standard 35 for hoist means hereinafter described is supported in the upper central portion of the bulkhead frame. Hoist standard 35 is supported on thrust bearing 36 (FIG. 5) and extends through sleeve 37 and ring ball bearing 36A mounted in cross beam 29. A bracket 38 rigidly secured to the uppermost end of hoist standard 35 supports hoist boom 39. A bracket 40 rigidly secured to a collar 41 at the lowermost end of the boom standard supports one end of a strut 42, the opposite end of which is attached at 43 to the hoist boom 39. Boom 39 and strut 42 may be of any standard construction. If desired they may be telescoping for extension and retraction.

Limited rotation of the hoist boom 39 is accomplished through a pair of upper and lower boom drive sprockets 44 and 45, respectively, rigidly mounted on the uppermost end of hoist standard 35 on the side opposite from bracket 38. Desirably the boom pivots about 160°. To rotate the boom in one direction, one end of a sprocket roller chain 46 is secured to one end of boom drive sprocket 44 and extends partially around the sprocket. The opposite end of chain 46 is secured to the end of piston 47 of hydraulic cylinder 48 which is supported in bracket 49 at the right hand end of bulkhead cross beam 29. To rotate the boom in the opposite direction, one end of a further drive chain 50 is secured to the opposite end of drive sprocket 45 to extend partially around that sprocket. The opposite end of chain 50 is connected to piston 51 of cylinder 52 supported in bracket 53 at the left hand end of bulkhead cross beam 29. Causing the piston of one cylinder to retract exerts force upon one chain which is transmitted to the corresponding sprocket to partially unwind the chain from that sprocket while at the same time the piston of the opposite cylinder is extended and the chain is wrapped around the other drive sprocket, with resulting rotation of standard 35 and boom 39.

Hoist boom 39 extends rearwardly from bulkhead 28, generally horizontally and preferably slightly angularly upwardly. The boom is elevated above the bed deck to permit working space below. A goose-neck type boom tip or extension 54 at the outer extremity of the boom arm supports a pivotally suspended pulley block 55. A standard winch 56 is supported at the top end of the hoist standard 35 for rotation therewith. Winch 56 is preferably a 3000 pound variable speed planetary hydraulic winch driven by an hydraulic motor 57. A wire rope or cable 58 extends from winch 56 over the top of boom 39 to pulley block 55. Tow line pulls of 30 and 60 feet per minute are preferred for most purposes. A hook 59 or similar grappling means is carried by the end of cable 58.

As seen in FIGS. 2, 3 and 3A, to facilitate loading of long rigid objects such as logs, pipe, etc., an elongated tail roller 60 is journaled in brackets 61 at opposite sides of the tilt bed immediately adjacent to the rear edge of the bed. Such long stiff objects engage the surface of the roller and cause it to rotate, easing the objects onto the bed as they are pulled by the winch and tow line. Using a 3000 pound winch, 5000 to 6000 pound logs may be loaded over the tail roller. Desirably, roller 60 is provided with one or more sets of longitudinally aligned slots 62 adapted to engage forward hook-like members 62A of inclined ramps 62B to facilitate loading of wheeled vehicles and skid mounted equipment, and the like, onto the bed in its normal level position.

Tilt bed 18 is provided with forward and rearward side walls or gates 63 and 64, respectively, hingedly secured to the bed frame on the opposite sides thereof. Each side gate includes a plurality of parallel spaced apart vertical bar members 65 and horizontal members 66 forming a rigid frame faced on one side with paneling 67, such as steel plate. As best seen in conjunction with FIG. 10, the side gates 63 and 64 are hingedly mounted on pins or rods 68 held in brackets 69 attached to the longitudinal side beams 21 and 22 of the tilt bed frame. The bottommost end of each vertical side gate member 65 is provided with a slot 70 which engages pin or rod 68. The bottommost ends of members 65 are provided with an arcuate cam-like surface 71 which extends below the bottommost edge of side gate paneling 67.

Figures 8, 10:
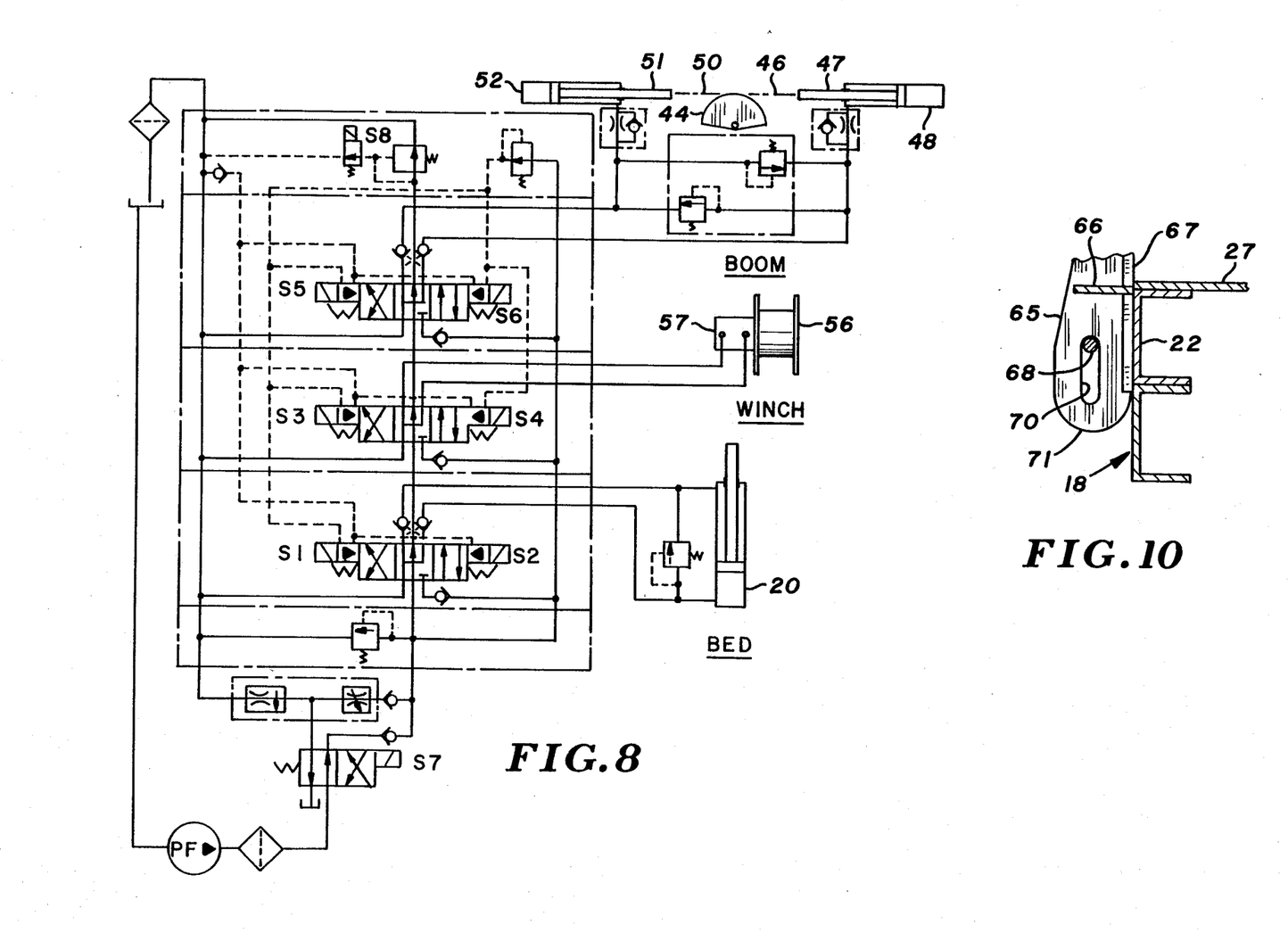
FIG. 8 is a schematic diagram of the hydraulic system by which tilting of the bed, rotation of the hoist boom, and operation of the winch are controlled.
FIG. 10 is a section, on an enlarged scale, on the line 10—10 of FIG. 2 and in the direction of the arrows showing hinge and locking means for the bed side gates.

When the side gates are in upright position, the top ends of slots 70 engage pins or rods 68. The bottommost end of paneling 67 bears against and engages the outermost edge of the tilt bed side beams 21 and 22 to maintain the side gates in upright locked position. The side gates may be readily lowered by manually lifting them to disengage the top ends of slots 70 from pins or rods 68. The cam-like arcuate edges 71 of the side gate vertical members 65 engage the edge of the bed side beam permitting the side gate to be rotated outwardly and downwardly to come to rest with the opposite ends of slots 70 engaging pins or rods 68 and suspending the side gates in vertical position below the bed deck to facilitate side loading onto the bed.

Cut-outs 72 and 73 in the paneling 67 of the rearmost side gates 64, adjacent to the horizontal frame members 66, provide aircraft style steps to facilitate climbing onto the bed when the side gate is in its lowered position. The rearward side gates 63 are preferably spaced forward from the bulkhead 28 a sufficient distance to permit entry by a workman when the rear side gates are in raised position. A ladder 74 is preferably provided for this purpose.

An elevated platform or basket 75 extends forwardly from the top edge of bulkhead 28 and partially overlies the truck cab 17 when the tilt bed is in its lowered over-the-road position. Basket 75 may be used for the storage of supplies and equipment. A plurality of holes 76 are provided around the periphery to permit the use of Bungy cords or similar fastening members to hold stored material in place. The bottom wall 77 of the basket/carrier preferaby is formed of expanded metal for drainage, to prevent the accumulation of rain water or the like.

A trailer hitch member 78 extends downwardly from the tiltable bed 18 adjacent the center of its rearward end and serves, for example, as a mount for tail lights, brake lights, back-up lights, or the like; as well as a mounting for a trailer hitch, or the like.

Figures 6, 7A:
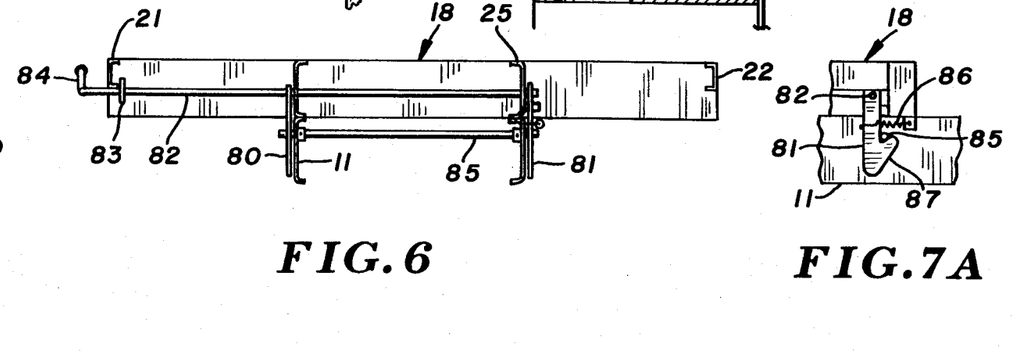
FIG. 6 is a fragmentary transverse vertical section on the line 6—6 of FIG. 3 showing details of the mechanism for locking the tiltable bed to the vehicle frame.
FIG. 7A is a right end view of the locking mechanism.
Figure 7:
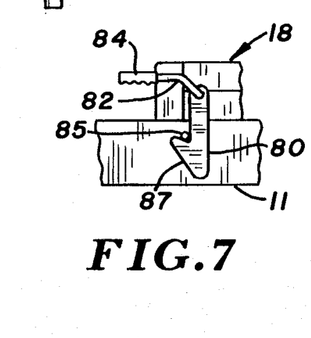
FIG. 7 is a left end view of the locking mechanism.

The tilt bed is provided with a self-engaging latch mechanism, as shown in FIGS. 6, 7 and 7A. A pair of latch hooks 80 and 81 are welded or otherwise rigidly secured to a crank arm 82 which is journaled for limited rotation in the bed longitudinal frame members 25 on the underside of the bed and bracket 83 adjacent the left side of the bed. Crank arm 82 terminates in a handle 84. Latch hooks 80 and 81 are spaced so as to extend downwardly from the bed outside of but closely adjacent to the side edges of truck chassis frame 11. The latch hooks engage latch pins formed by the opposite ends of a latch rod 85 mounted in chassis frame 11 and extending out on opposite sides of the chassis frame. The crank arm is spring biased in the locked position, as by means of spring 86. The face edges 87 of latch hooks 80 and 81 are tapered. When the bed is lowered, the tapered edges of the hooks bear against the latch pins and the downward movement of the bed causes the latch hooks to engage rod 85 and lock the bed in place. When it is desired to tilt the bed, downward force on handle 84 causes the latch hooks to become disengaged to free the bed for lifting.

Figure 9:
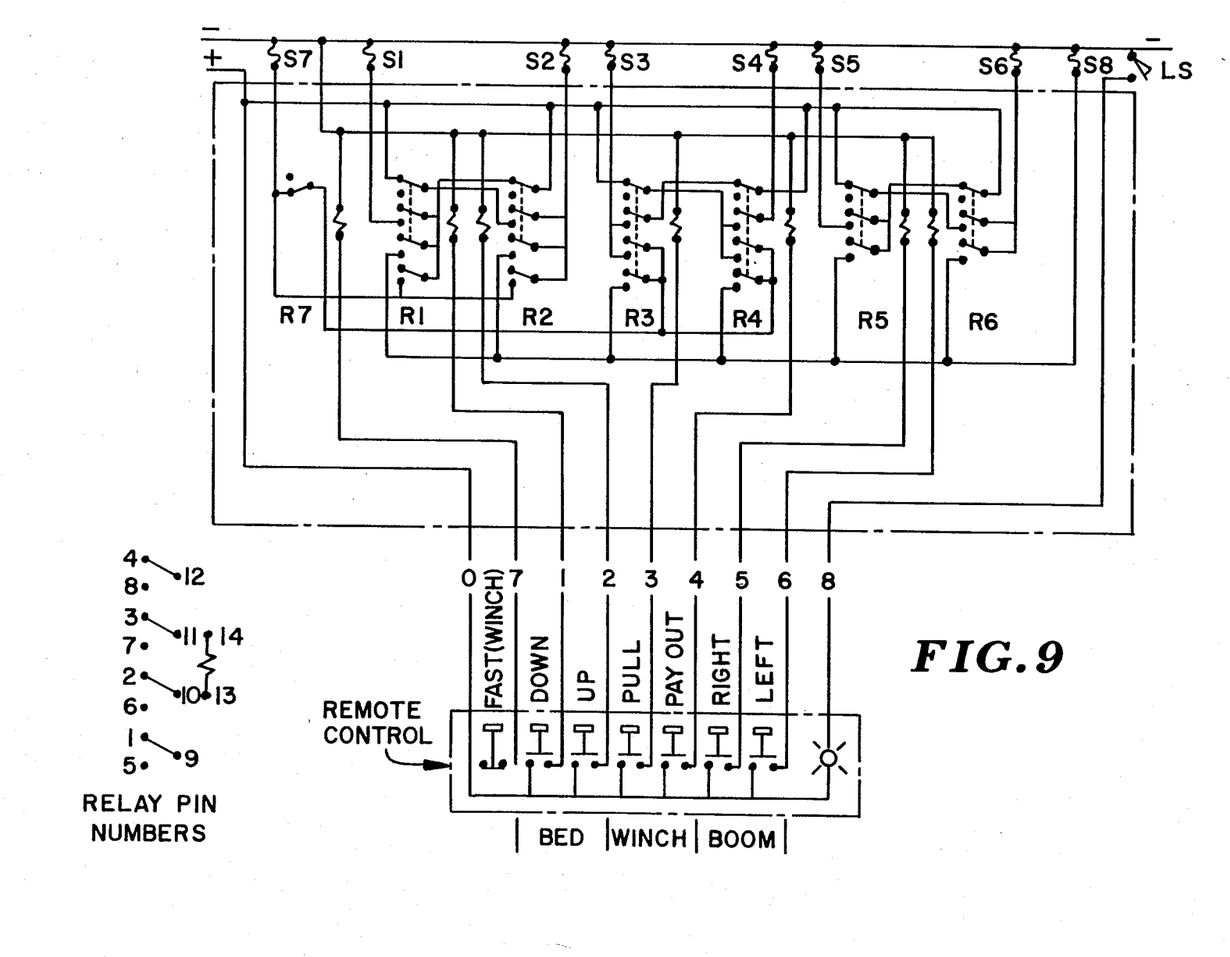
FIG. 9 is a schematic diagram of the electrical system by which operation of the hydraulic system is remotely controlled.

Operation of the bed lift and winch, and rotation of the hoist boom is by means of a conventional hydraulic system. The system may be manually controlled. Preferably, however, operation of the system is remotely controlled from a hand-held panel connected through a hard wire umbilical or wireless connection. As seen in FIGS. 8 and 9, the systems may be operated from a remote hand-held control panel 88. Control panel 88 contains a plurality of push buttons which control up and down movement of the tilt bed, in and out movement of the winch cable, and right and left rotation of the hoist boom. Preferably the winch drive is two-speed and a separate fast-slow toggle switch is provided for fast operation of the winch. Depressing one of the push buttons triggers one of a series of relays R1 through R7, which in turn actuate solenoids S1 through S8 controlling valves regulating flow of pressurized fluid to hydraulic cylinders 20, 48 and 52 and hydraulic motor 58, in the conventional manner.

Remote control of the bed tilt, hoist rotation and winch functions permits one person operation for safety and efficiency. One person and one piece of equipment can load, carry and dump heavy material and equipment.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A tilt bed for mounting on a truck equipped with lift means, said bed comprising:
   (A) a frame adapted for pivotal attachment adjacent its rearward end to the rearward end of the truck frame and for pivotal attachment adjacent its forward end to the lift means of the truck;
   (B) decking over said frame;
   (C) a transverse front bulkhead frame extending vertically upward from the forward end of said frame;
   (D) elevated hoist means supported on said bed adjacent to the forward end thereof for lifting movement therewith, said hoist means including:
      (1) a vertical standard rotatably supported in said front bulkhead frame for rotation about a vertical axis,
      (2) an elongated boom extending rearwardly from the top of said vertical standard and connected thereto for rotation therewith, said boom being elevated above the deck of said flat bed,
      (3) winch means mounted on said standard for rotation therewith,
      (4) power means for rotating said boom, and
      (5) separate power means for actuating said winch,
   (E) transverse roller means journaled for rotation adjacent the rearward edge of said bed; and
   (F) control means for independently operating said lift means, boom rotation means and winch means.

2. A tilt bed according to claim 1 wherein:
   (A) longitudinally extending side gates are hingedly supported on opposite sides of said bed; and
   (B) locking means are provided for securing said side gates in upright position.

3. A tilt bed according to claim 2 wherein said side gates each include:
   (A) a frame;
   (B) a longitudinal plate supported by said frame and engageable with the side of said bed frame in face-to-face relation when the side gates are in upright position;
   (C) a plurality of vertical frame members comprising part of the frame, the bottom-most ends of which extend below the bottom edge of said plate;
   (D) slots in said frame members adjacent the bottom-most ends, said slots engageable with hinge pins supported on the sides of said bed frame; and
   (E) an arcuate cam-like edge at the ends of said frame members.

4. A tilt bed according to claim 2 wherein:
   (A) said side gates each include a frame having a plurality of vertical frame members, a plurality of horizontal frame members and paneling supported by said frame; and
   (B) a plurality of foot openings are provided in said paneling, each immediately adjacent to one of said horizontal and one of said vertical frame members to form aircraft-style steps when said side gate is in lowered position.

5. A tilt bed according to claim 1 wherein said power means for rotating said boom comprises a pair of oppositely acting hydraulic cylinders operatively connected to said hoist standard.

6. A tilt bed according to claim 5 wherein:
   (A) said vertical hoist standard includes a pair of vertically spaced semi-circular drive sprockets in stacked relation on one side thereof adjacent the top of said bulkhead frame;
   (B) a pair of hydraulic cylinders is supported by the top of said bulkhead frame at opposite ends thereof;
   (C) a first drive chain is attached to one end of one of said drive sprockets, extending partially around said sprocket to a connection with the piston of one of said cylinders; and
   (D) a second drive chain is attached to the opposite end of the other of said drive sprockets, extending partially around said other sprocket to a connection with the piston of the other of said cylinders.

7. A tilt bed according to claim 1 wherein said transverse tail roller has a plurality of longitudinally aligned slots in its surface, said slots being adapted to be temporarily engaged by hook-like members of the forward end of at least one inclined ramp to facilitate loading of vehicles and skid mounted materials.

8. A tilt bed truck having a hoist and fold-down sides comprising:
   (A) a truck having a frame supported on front and rear axles, wheels on said axles, a forwardly mounted motor and a driver's cab;
   (B) a tiltable flat bed pivotally supported on said frame adjacent to the rearward end of said frame;
   (C) lift means for said bed pivotally secured at one end to said truck frame and at the other end adjacent to the forward end of said bed;
   (D) power means for actuating said lift means;
   (E) a transverse front bulkhead frame extending vertically upward from the forward end of said bed;

(F) hoist mean supported on said bed adjacent to the forward end thereof for movement therewith, said hoist means including:
  (1) a vertical standard rotatably supported in said front bulkhead frame for limited rotation about a vertical axis,
  (2) an elongated generally horizontal boom extending rearwardly from the top of said vertical standard and connected thereto for rotation therewith, said boom being spaced above the deck of said flat bed,
  (3) winch means mounted on said standard for rotation therewith,
  (4) power means for rotating said boom, and
  (5) separate power means for actuating said winch,
(G) transverse roller means journaled for rotation adjacent the rearward edge of said bed; and
(H) control means for independently operating said lift means, boom rotation means and winch means.

9. A tilt bed truck according to claim 8 wherein:
(A) longitudinally extending side gates are hingedly supported on opposite sides of said bed; and
(B) locking means are provided for securing said side gates in upright position.

10. A tilt bed truck according to claim 9 wherein said side gates each include:
(A) a frame;
(B) a longitudinal plate supported by said frame and engageable with the side of said bed frame in face-to-face relation when the side gates are in upright position;
(C) a plurality of vertical frame members comprising part of the frame, the bottommost ends of which extend below the bottom edge of said plate;
(D) slots in said frame members adjacent the bottommost ends, said slots engageable with hinge pins supported on the sides of said bed frame; and
(E) an arcuate cam-like edge at the ends of said frame members.

11. A tilt bed truck according to claim 9 wherein:
(A) said side gates each include a frame having a plurality of vertical frame members, a plurality of horizontal frame members and paneling supported by said frame; and
(B) a plurality of foot openings are provided in said paneling, each immediately adjacent to one of said horizontal and one of said vertical frame members to form aircraft-style steps when said side gate is in lowered position.

12. A tilt bed truck according to claim 8 wherein said power means for rotating said boom comprises a pair of oppositely acting hydraulic cylinders operatively connected to said hoist standard.

13. A tilt bed truck according to claim 12 wherein:
(A) said vertical hoist standard includes a pair of vertically spaced semi-circular drive sprockets in stacked relation on one side thereof adjacent the top of said bulkhead frame;
(B) a pair of hydraulic cylinders is supported by the top of said bulkhead frame at opposite ends thereof;
(C) a first drive chain is attached to one end of one of said drive sprockets, extending partially around said sprocket to a connection with the piston of one of said cylinders; and
(D) a second drive chain is attached to the opposite end of the other of said drive sprockets, extending partially around said other sprocket to a connection with the piston of the other of said cylinders.

14. A tilt bed truck according to claim 13 wherein said transverse tail roller has a plurality of longitudinally aligned slots in its surface, said slots being adapted to be temporarily engaged by hook-like members at the forward end of at least one inclined ramp to facilitate loading of vehicles and skid mounted materials.

15. A tilt bed truck according to claim 8 wherein self-engaging latch means are provided between said truck frame and tilt bed, said latch means comprising:
(A) a pair of latch pins extending transversely outward from the sides of said truck frame forwardly of the bed lift means;
(B) a spring-biased crank arm journaled for limited rotation in the underside of said tilt bed frame adjacent the forward end thereof;
(C) a pair of latch hooks rigidly secured to said crank arm for limited rotation therewith, said latch hooks being engageable with said latch pins in locking relation, said latch hooks having tapered edges engageable with said latch pins to guide said hooks into locking position; and
(D) a handle on said crank arm to manually disengage said hooks.

16. A tilt bed for mounting on a truck equipped with lift means, said bed comprising:
(A) a frame adapted for pivotal attachment adjacent its rearward end to the rearward end of the truck frame and for pivotal attachment adjacent its forward end to the lift means of the truck;
(B) decking over said frame;
(C) a transverse front bulkhead frame extending vertically upward from the forward end of said frame;
(D) elevated hoist means supported on said bed adjacent to the forward end thereof for lifting movement therewith, said hoist means including:
  (1) a vertical standard rotatably supported in said front bulkhead frame for limited rotation about a vertical axis.
  (2) a pair of vertically spaced semi-circular drive sprockets in stacked relation on one side of said standard adjacent the top of said bulkhead frame,
  (3) a pair of hydraulic cylinders supported by the top of said bulkhead frame at opposite ends thereof,
  (4) a first drive chain attached to one end of one of said drive sprockets, extending partially around said sprocket to a connection with the piston of one of said cylinders,
  (5) a second drive chain is attached to the opposite end of the other of said drive sprockets, extending partially around said other sprocket to a connection with the piston of the other of said cylinders,
  (6) an elongated generally horizontal boom extending rearwardly from the top of said vertical standard and connected thereto for rotation therewith, said boom being elevated above the deck of said flat bed,
  (7) winch means mounted on said standard for rotation therewith, and
  (8) separate hydraulic power means for actuating said winch,
(E) longitudinally extending side gates hingedly supported on opposite sides of said bed;
(F) locking means for securing said side gates in upright position;
(G) transverse roller means journaled for rotation adjacent the rearward edge of said bed; and (H) control means for independently operating said lift means, boom rotation means and winch means.

17. A tilt bed according to claim 16 wherein said side gates each include:
(A) a frame;
(B) a longitudinal plate supported by said frame and engageable with the side of said bed frame in face-to-face relation when the side gates are in upright position;
(C) a plurality of vertical frame members comprising part of the frame, the bottom-most ends of which extend below the bottom edge of said plate;
(D) slots in said frame members adjacent the bottom-most ends, said slots engageable with hinge pins supported on the sides of said bed frame; and
(E) an arcuate cam-like edge at the ends of said frame members.

18. A tilt bed according to claim 16 wherein:
(A) said side gates each include a frame having a plurality of vertical frame members, a plurality of horizontal frame members and paneling supported by said frame; and
(B) a plurality of foot openings are provided in said paneling, each immediately adjacent to one of said horizontal and one of said vertical frame members to form aircraft-style steps when said side gate is in lowered position.

19. A tilt bed according to claim 16 wherein said transverse tail roller has a plurality of longitudinally aligned slots in its surface, said slots being adapted to be temporarily engaged by hook-like members of the forward end of at least one inclined ramp to facilitate loading of vehicles and skid mounted materials.

20. A flat bed for mounting on a wheeled truck or truck trailer, said bed comprising:
(A) a frame, said frame being of a width to extend beyond the wheels of the truck or truck trailer on which the bed is to be mounted;
(B) decking over said frame;
(C) longitudinally extending side gates hingedly supported on opposite sides of said bed, said side gates being of a width less than the distance from the decking on the top of the bed to the ground when mounted on a truck or truck trailer; and said side gates being capable of rotation between an upright vertical position and downward vertical position, and having locking means for securing said side gates in upright position, said side gates each including
(1) a frame;
(2) a longitudinal plate having top and bottom edges supported by said frame below the decking forming the upper surface of the bed and engageable with the side of said bed frame in face-to-face relation when the side gates are in upright position;
(3) said side gate frame including a plurality of vertical frame members having top ends and bottom ends, the bottommost ends of said vertical frame members extending below the bottom edge of said plate;
(4) slots in said vertical frame members adjacent the bottommost ends, said slots engageable with hinge pins supported on the sides of said bed frame and fixed thereto; and
(5) an arcuate cam-like edge at the ends of said vertical frame members engageable with said longitudinal plate.

21. A tilt bed according to claim 20 wherein:
(A) said side gate frames each include a plurality of horizontal frame members and paneling supported by said frame; and
(B) a plurality of foot openings are provided in said paneling, each immediately adjacent to one of said horizontal and one of said vertical frame members to form aircraft-style steps when said side gate is in lowered position.

* * * * *